US012020669B1

(12) United States Patent
Campbell

(10) Patent No.: US 12,020,669 B1
(45) Date of Patent: Jun. 25, 2024

(54) MOBILE STEEL GUITAR

(71) Applicant: Daniel Campbell, Clearwater, FL (US)

(72) Inventor: Daniel Campbell, Clearwater, FL (US)

( * ) Notice: Subject to any disclaimer, the term of this patent is extended or adjusted under 35 U.S.C. 154(b) by 0 days.

(21) Appl. No.: 18/395,551

(22) Filed: Dec. 23, 2023

Related U.S. Application Data

(60) Provisional application No. 63/476,979, filed on Dec. 23, 2022.

(51) Int. Cl.
*G10D 1/08* (2006.01)
*G10D 3/06* (2020.01)
*G10D 3/14* (2020.01)

(52) U.S. Cl.
CPC ............... *G10D 1/085* (2013.01); *G10D 3/06* (2013.01); *G10D 3/14* (2013.01)

(58) Field of Classification Search
CPC ............. G10D 1/085; G10D 3/06; G10D 3/14
See application file for complete search history.

(56) References Cited

U.S. PATENT DOCUMENTS

| | | | | | |
|---|---|---|---|---|---|
| 1,834,804 | A * | 12/1931 | Puoina | G10D 1/08 | 84/267 |
| 5,337,643 | A * | 8/1994 | Cantrell | G10D 3/06 | 84/293 |
| 5,383,385 | A * | 1/1995 | Gilbert | G10D 1/085 | 84/293 |
| 7,586,029 | B2 * | 9/2009 | Peavey | G10D 1/08 | 84/267 |
| 8,476,512 | B1 * | 7/2013 | Corfe | G10D 1/04 | 84/293 |
| 8,618,393 | B1 * | 12/2013 | Peters | G10D 1/08 | 84/327 |
| 10,475,420 | B1 * | 11/2019 | Stadnyk | G10D 1/085 | |
| 10,540,946 | B2 * | 1/2020 | Reddick | G10D 3/02 | |
| 10,847,125 | B1 * | 11/2020 | Kim | G10G 5/005 | |
| 2019/0237047 | A1 * | 8/2019 | Reddick | G10D 3/12 | |

FOREIGN PATENT DOCUMENTS

| | | | | |
|---|---|---|---|---|
| GB | 2365198 A | * | 2/2002 | G10D 1/08 |
| GB | 2555109 A | * | 4/2018 | G10D 1/085 |

* cited by examiner

*Primary Examiner* — Robert W Horn
(74) *Attorney, Agent, or Firm* — Nolan IP Law; Jason M. Nolan

(57) ABSTRACT

A guitar having a headstock, a neck body extending about a longitudinal axis from a first end in contact with the headstock to a second end, an electronic body coupled to one side of the neck body, and an adjustable belly body coupled to an opposite side of the neck body. The belly body can be slidable about the longitudinal axis of the neck body. The belly body can be moved to an outwardly extended position to create a spaced distance between the belly body and the neck body. The belly body can be removably coupled to the first side of the neck body. The belly body can have a removable lid for accessing an interior of the belly body. The belly body is configured so a user can play the guitar while its top face having the guitar strings is facing upward and while the user is walking.

19 Claims, 16 Drawing Sheets

MOBILE STEEL GUITAR

CROSS-REFERENCE TO RELATED APPLICATIONS

This application claims the benefit of priority under 35 U.S.C. § 119(e) of U.S. Provisional Application Ser. No. 63/476,979, filed on Dec. 23, 2022, the content of which is relied upon and incorporated herein by reference in its entirety.

FIELD

The present disclosure generally relates to a musical instrument; and more particularly, to a guitar; and more particularly, to a mobile guitar adapted for the user to play while standing upright or while walking around, and even more particularly, to a mobile electric steel guitar adapted for the user to play while standing upright and/or while walking around.

BACKGROUND

Existing electric guitars are held vertically to the user and fitted with a strap to be played while the user is standing and/or walking around. Dobro guitars are played horizontally and have a strap to hold them in place, but they are acoustic instruments and dimensioned between 3 and 4 inches thick to keep them in position for the user. Steel guitars are electric guitars played with a metal bar or other hard object pressed against the guitar strings. Lap steel guitars do not have a strap because they are configured to be played by a seated user with the guitar held on the user's lap. Some lap steel guitars, called console steel guitars, are configured with legs so they are positioned horizontal to the user, but they are not held on the user's lap. Console steel guitars with pedals are called pedal steel guitars. For console guitars without pedals, the legs can be extended so the user can stand up while playing the instrument, but the user cannot walk around or dance while playing the guitar. For these reasons, there remains a need for a steel guitar adapted for the user to play while standing upright and for the user to be capable of walking or dancing around while playing the steel guitar.

SUMMARY

In various embodiments, a mobile steel guitar is provided. In some embodiments, the guitar comprises a headstock; an elongated neck body extending about a longitudinal axis of the guitar from a first end in contact with the headstock to a second end, the neck body having a top face, a bottom face opposite the top face, a first side, and a second side opposite the first side; an electronic body coupled to the second side of the neck body; and an adjustable belly body coupled to the first side of the neck body, wherein the belly body is slidable about the longitudinal axis of the neck body.

In some embodiments, the guitar comprises two or more removeable fasteners coupling the belly body to the first side of the neck body, wherein the two or more removeable fasteners are each fitted with a spring that allows the belly body to slide with respect to the neck body. In some embodiments, the fasteners can be loosened or tightened to allow the belly body to slide or not slide with respect to the neck body. In some embodiments, the fasteners are inserted through the springs and the springs allow the belly body to slide with respect to the neck body.

In some embodiments, the guitar comprises a spacing strip positioned between the first side of the neck body and the belly body, the spacing strip having a surface configured to facilitate the sliding of the belly body about the longitudinal axis of the neck body.

In some embodiments, the belly body comprises a top face, a bottom face opposite the top face, a first side having a flat surface configured to contact the first side of the neck body, and a second side, opposite the first side, having a curved surface configured to receive a torso of a user.

In some embodiments, the belly body comprises a stabilizer projecting downward from an edge of the bottom face and the second side of the belly body, the stabilizer having a curved surface configured to receive the torso of the user.

In some embodiments, the belly body comprises a stabilizer coupled to the curved surface of the belly body, the stabilizer extending below the bottom face of the belly body.

In some embodiments, the belly body is moveable about a lateral axis to create a spaced distance between the belly body and the neck body.

In some embodiments, the headstock comprises a plurality of tuners for receiving a plurality of guitar strings.

In some embodiments, the neck body comprises a fretboard, a nut, one or more pickup cavities, one or more pickups, a bridge, a bridge plate, a plurality of through-holes configured to receive a plurality of guitar strings, one or more benders, and/or a strap button.

In some embodiments, the electronic body comprises a removable lid, a volume knob, a tone knob, one or more electronic components, one or more wires, and/or a switch.

In various embodiments, a guitar is provided, comprising: a headstock; a neck body extending about a longitudinal axis of the guitar from a first end in contact with the headstock to a second end, the neck body having a top face, a bottom face opposite the top face, a first side, and a second side opposite the first side; an electronic body coupled to the second side of the neck body; and an adjustable belly body coupled to the first side of the neck body, wherein the belly body is moveable about a lateral axis from an adjacent position to an outwardly extended position that creates a spaced distance between the belly body and the neck body.

In some embodiments, the guitar comprises two or more removeable fasteners coupling the belly body to the neck body, wherein the spaced distance is maintained by a spacer configured for each respective fastener.

In various embodiments, a guitar is provided, comprising: a headstock; a neck body extending about a longitudinal axis of the guitar from a first end in contact with the headstock to a second end, the neck body having a top face, a bottom face opposite the top face, a first side, and a second side opposite the first side; an electronic body coupled to the second side of the neck body; and a belly body that is removably coupled to the first side of the neck body, the belly body comprising a removable lid on a top face for access to an interior of the belly body, the interior comprising two or more removeable fasteners coupling the belly body to the neck body.

It is to be understood that both the foregoing general description and the following detailed description describe various embodiments and are intended to provide an overview or framework for understanding the nature and character of the claimed subject matter. The accompanying drawings are included to provide a further understanding of the various embodiments and are incorporated into and constitute a part of this specification. The drawings illustrate the various embodiments described herein and, together with the description, explain the principles and operations of the claimed subject matter.

BRIEF DESCRIPTION OF THE DRAWINGS

A complete understanding of the present embodiments and the advantages and features thereof will be more readily understood by reference to the following detailed description, appended claims, and accompanying drawings, wherein:

Figure 1:
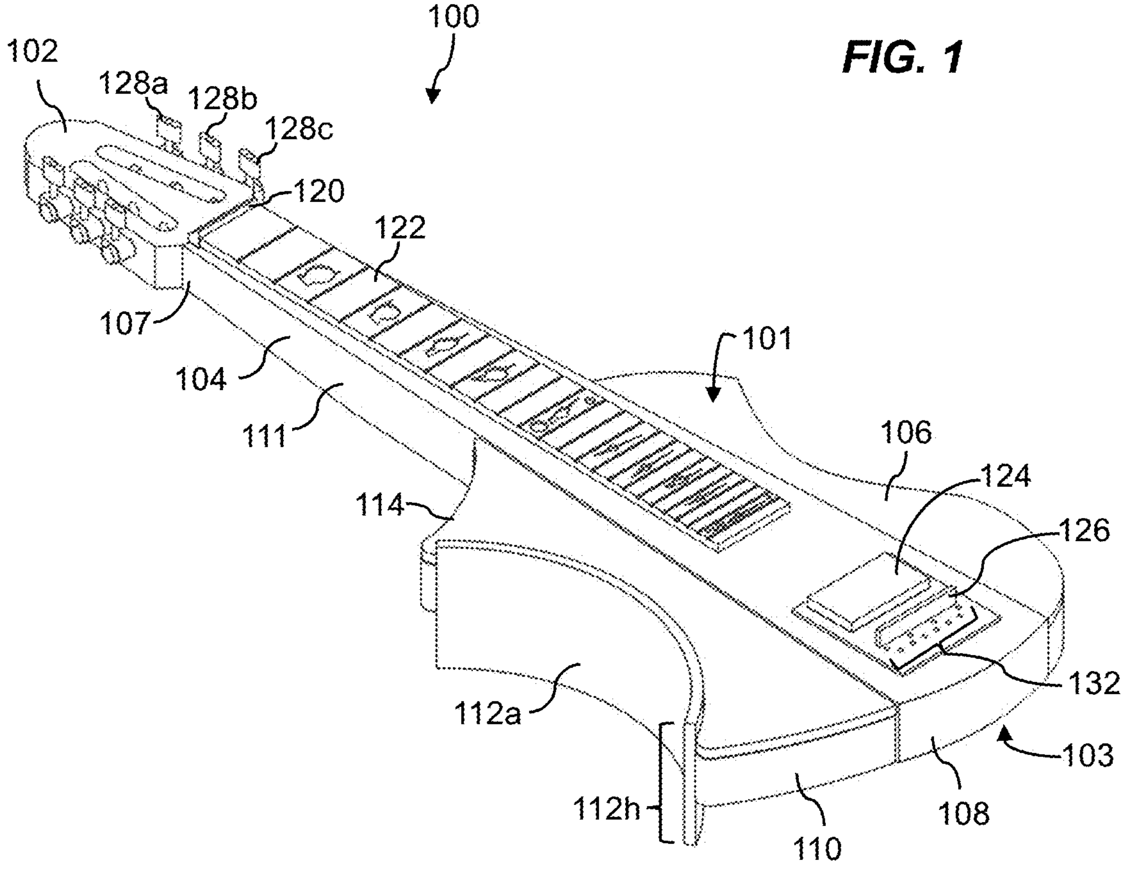
FIG. 1 is a top perspective view of a mobile steel guitar, in accordance with some embodiments described herein.

The drawings are not necessarily to scale, and certain features and certain views of the drawings may be shown exaggerated in scale or in schematic in the interest of clarity and conciseness.

DETAILED DESCRIPTION

Reference will now be made in detail to the exemplary embodiment(s), examples of which is/are illustrated in the accompanying drawings. Whenever possible, the same reference characters will be used throughout the drawings to refer to the same or like parts. Although specific features of the present embodiments may be shown in some drawings and not in others, this is for convenience only. Any feature of a drawing may be referenced and/or claimed in combination with any feature of any other drawing. The specific details of the various embodiments described herein are used for demonstration purposes only, and no unnecessary limitation or inferences are to be understood therefrom. An embodiment refers to a particular feature or characteristic used in connection with a product described herein. References to an "embodiment" appear throughout the disclosure, and such references are not necessarily referring to the same embodiment or to separate, mutually exclusive embodiment.

Before describing the exemplary embodiments, it is noted the embodiments reside primarily in combinations of components related to the guitar. Accordingly, the guitar components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In various embodiments, as shown in FIGS. 1-14, a mobile steel guitar 100 is provided. In some embodiments, the mobile steel guitar 100 is an electric guitar. The guitar 100 can comprise a plurality of components. In some embodiments, as shown in FIGS. 1-5, 7-12, and 14, for example, the guitar 100 comprises a headstock 102, a neck body 104, an electronic body 106, and a belly body 110. In some embodiments, the belly body 110 is movable, adjustable, slidable, outwardly extendable, and/or replaceable with respect to its position relative to the neck body 104.

Figure 7:
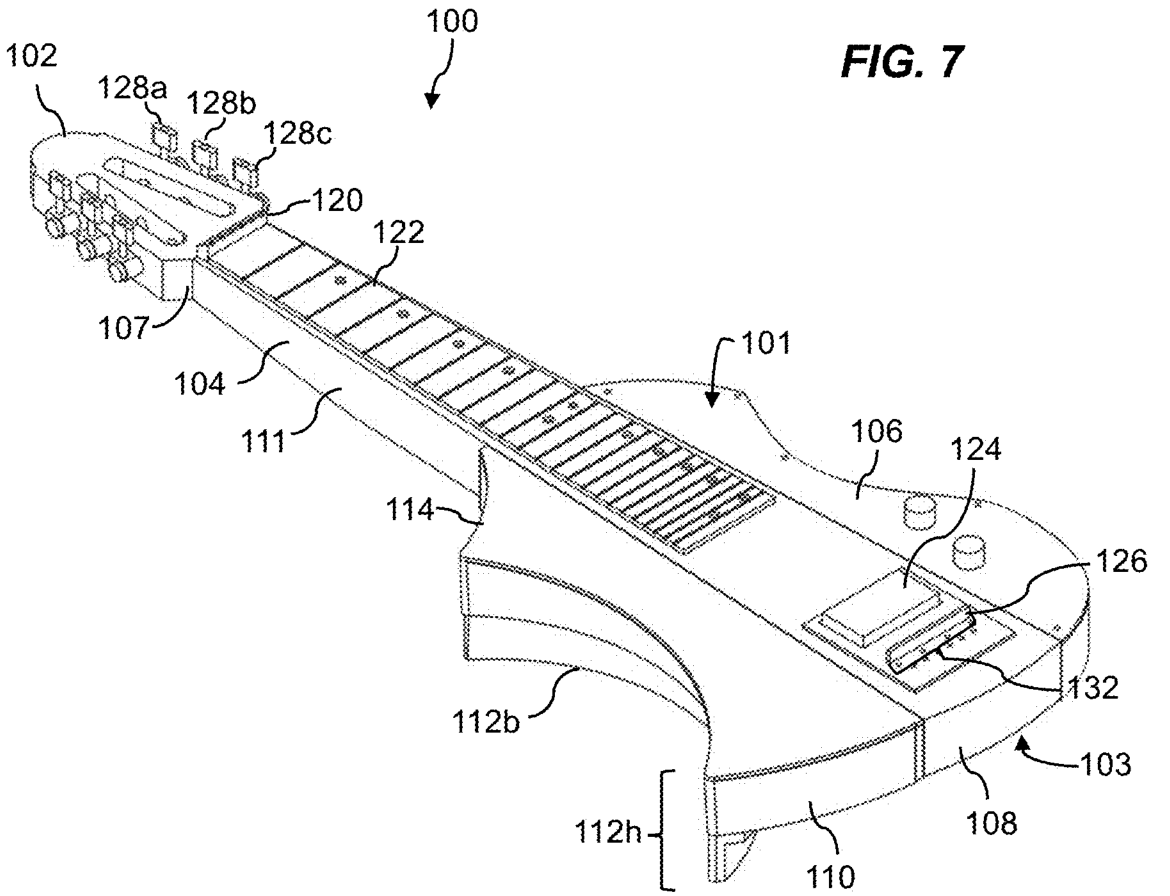
FIG. 7 is a top perspective view of a mobile steel guitar, in accordance with some embodiments described herein.
Figure 8:
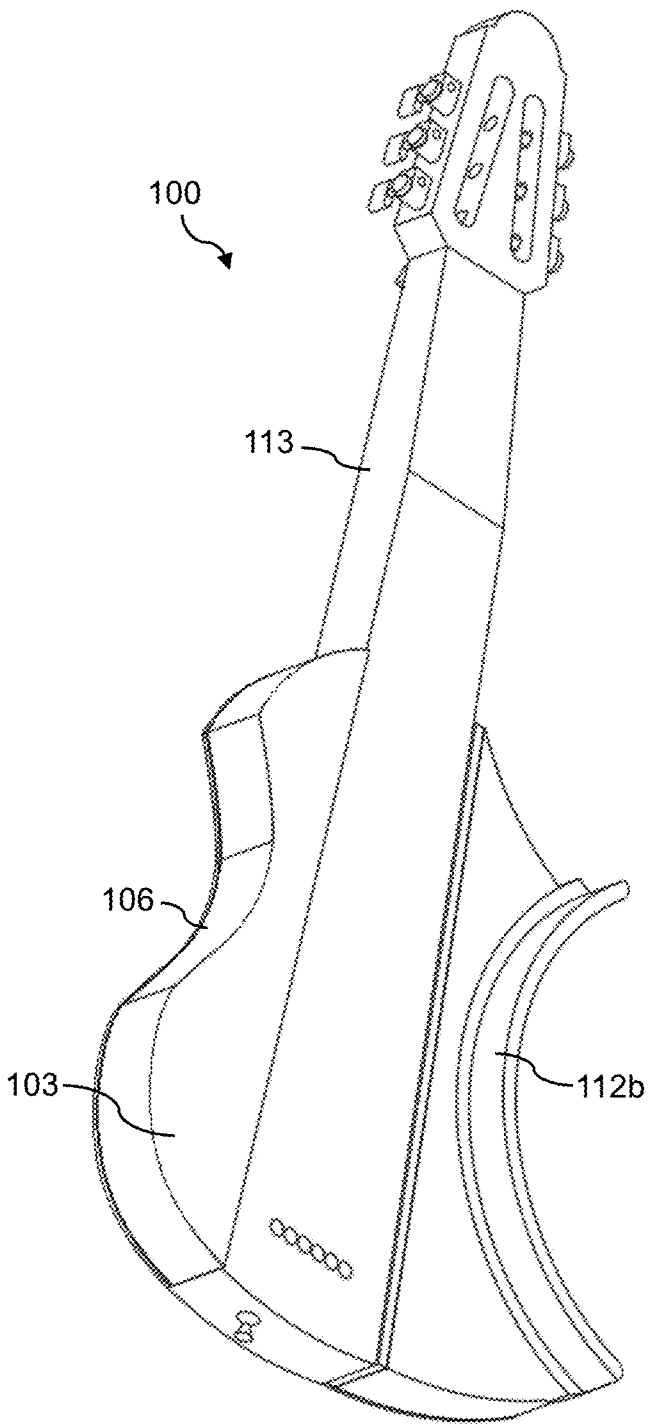
FIG. 8 is bottom perspective view of the guitar of FIG. 7.

In some embodiments, as shown in FIGS. 1-4, FIGS. 7-11, and FIG. 14, the guitar 100 comprises a top face 101 and a bottom face 103, which are separated by a spaced distance that is defined by the height of the guitar components, including the headstock 102, the neck body 104, the electronic body 106, and the belly body 110. The top face 101 of the guitar 100, including the neck body 104, is the surface on which the guitar strings 148 (FIG. 14) are arranged for playing the instrument, as shown in FIG. 7. In some embodiments, the top face 101 of the neck body 104 includes one or more components, including a fretboard 122, a nut 120, a pickup 124, benders 146, guitar strings 148, etc. In some embodiments, the fretboard 122 functions as a visual reference for the user and does not contain frets for the user to press the strings against. The bottom face 103 is the surface of the guitar 100 opposite the top face 101.

Figure 6A:
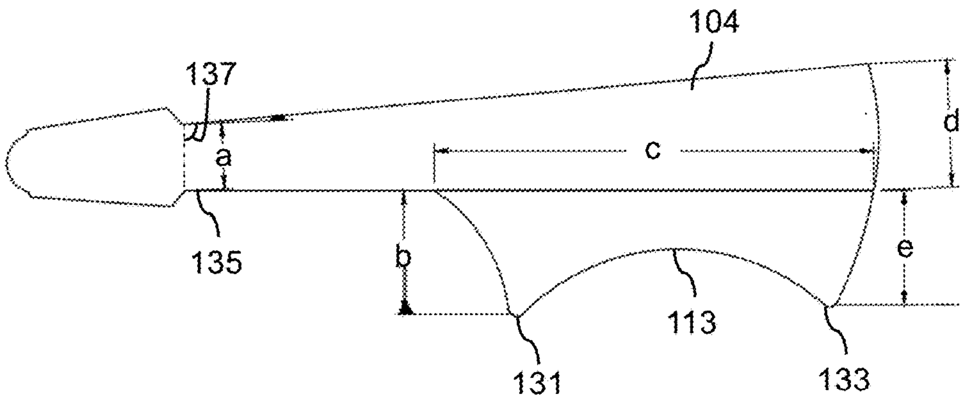
FIG. 6A is a plan view of the neck body and belly body of the guitar of FIG. 1.
Figure 6B:
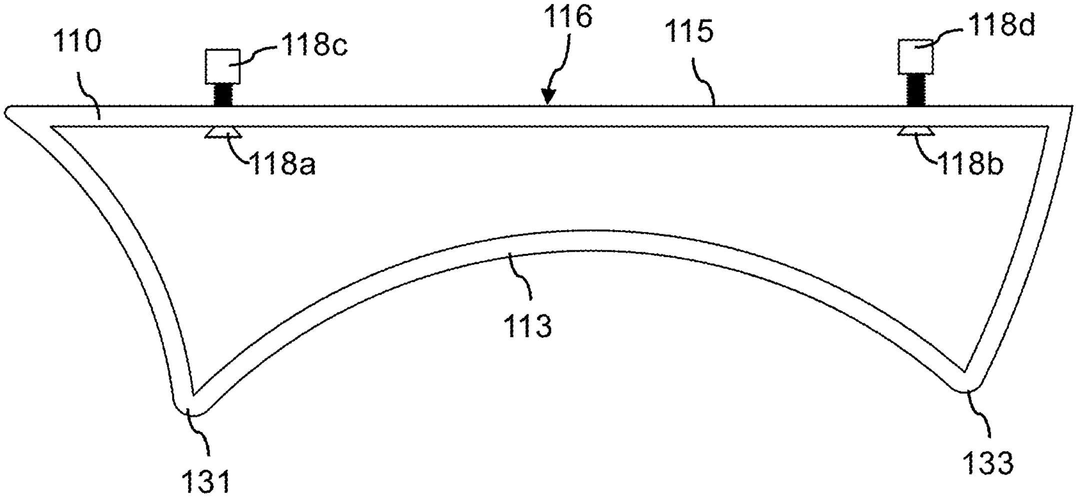
FIG. 6B is a top view of the belly body of the guitar of FIG. 1.
Figure 6C:
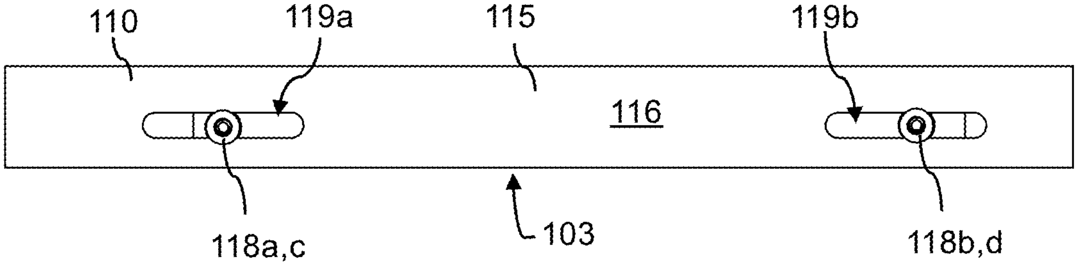
FIG. 6C is a side view of the belly body of FIG. 6A.
Figure 6D:
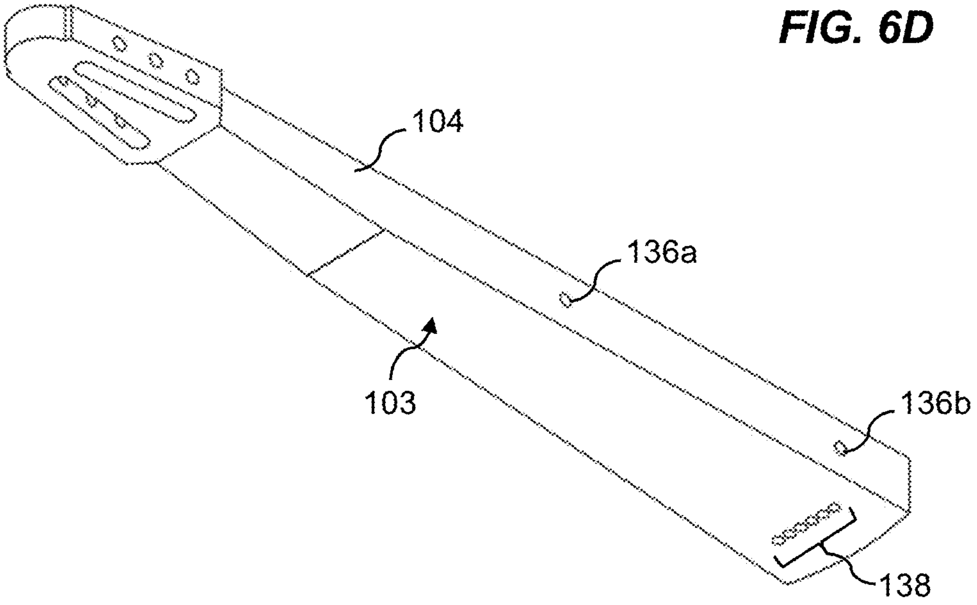
FIG. 6D is a bottom perspective view of the neck body of the guitar of FIG. 1.
Figure 6E:
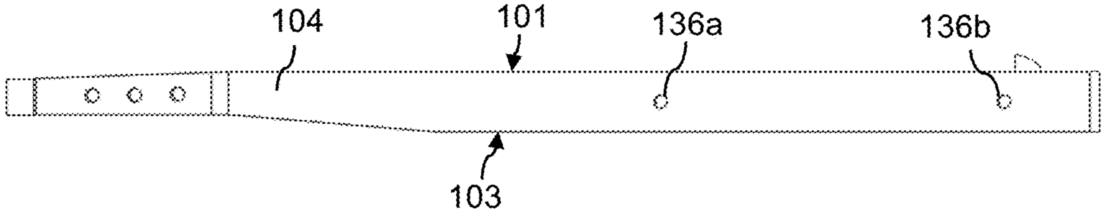
FIG. 6E is a side view of the neck body of the guitar of FIG. 1.

The respective heights of the guitar components, including the headstock 102, neck body 104, electronic body 106, and belly body 110 may be the same or different at various positions on each respective component (i.e., the same component may have varying heights) and relative to one another (i.e., two or more components may have the same or different heights). As such, the spaced distance between the top face 101 and the bottom face 103 may be the same or different depending on which component of the guitar 100 is referred to and/or which position of a specific component is referred to. For example, the headstock 102 may have a different height than the belly body 110 and/or the electronic body 106. In some embodiments, for example, the neck body 104 and/or the headstock 102 may have a tapered height that gradually changes about its longitudinal axis. For example, the height of the neck body 104 may be smaller near the headstock 102 relative to its height at a position near the electronic body 106 and belly body 110. In some embodiments, the neck body 104 has a tapered height between the top face 101 and the bottom face 103 and the tapering refers to the bottom face 103, as shown in FIG. 6D and FIG. 6E.

In some embodiments, the headstock 102 comprises one or more tuners. For example, as shown in FIGS. 1-5, FIGS. 7-12, and FIG. 14, the headstock 102 comprises a plurality of tuners operatively coupled to the headstock 102, including the tuners 128*a*, 128*b*, 128*c*, etc. The number of tuners can vary depending on the number of strings on the steel guitar 100. In some embodiments, the headstock 102 comprises four tuners, four or more tuners, six tuners, six or more tuners, twelve tuners, etc. In some embodiments, the headstock 102 and the neck body 104 are comprised of a single, unitary piece (e.g., derived from a single piece of wood). In other embodiments, the headstock 102 and the neck body 104 are comprised of two or more discrete pieces that have been coupled together to form a unitary piece.

In some embodiments, as shown in FIGS. 1-6A, FIGS. 7-12, and FIG. 14, the neck body 104 comprises an elongated structure extending about the longitudinal axis of the steel guitar 100. In some embodiments, the neck body 104 extends from a first end 107 adjacent to, in contact with, and/or abutting the headstock 102 to the second end 108 opposite the first end 107. In some embodiments, as shown in FIGS. 1-4 and FIGS. 7-11, the neck body 104 comprises a first side 111 and a second side 113. In some embodiments, for example, the neck body 104 comprises the nut 120, the fretboard 122, one or more (e.g., two, three) pickups, including the pickup 124, the bridge 126, and the one or more benders 146.

In some embodiments, the electronic body 106 and the neck body 104 are comprised of a single, unitary piece (e.g., derived from a single piece of wood). In other embodiments, the electronic body 106 and the neck body 104 are comprised of two discrete pieces that have been coupled together to form a unitary piece. In some embodiments, as shown in FIGS. 1-5 and FIGS. 7-11, the electronic body 106 is coupled to the second side 113 of the neck body 104. The electronic body 106, in conjunction with the neck body 104, contains the components required to control and electronically amplify the sounds emanating from the guitar 100. As would be appreciated by one of ordinary skill in the art, the electronic components include, for example, electrical wires, potentiometers, switches, capacitors, output jack, etc.

Figure 2:
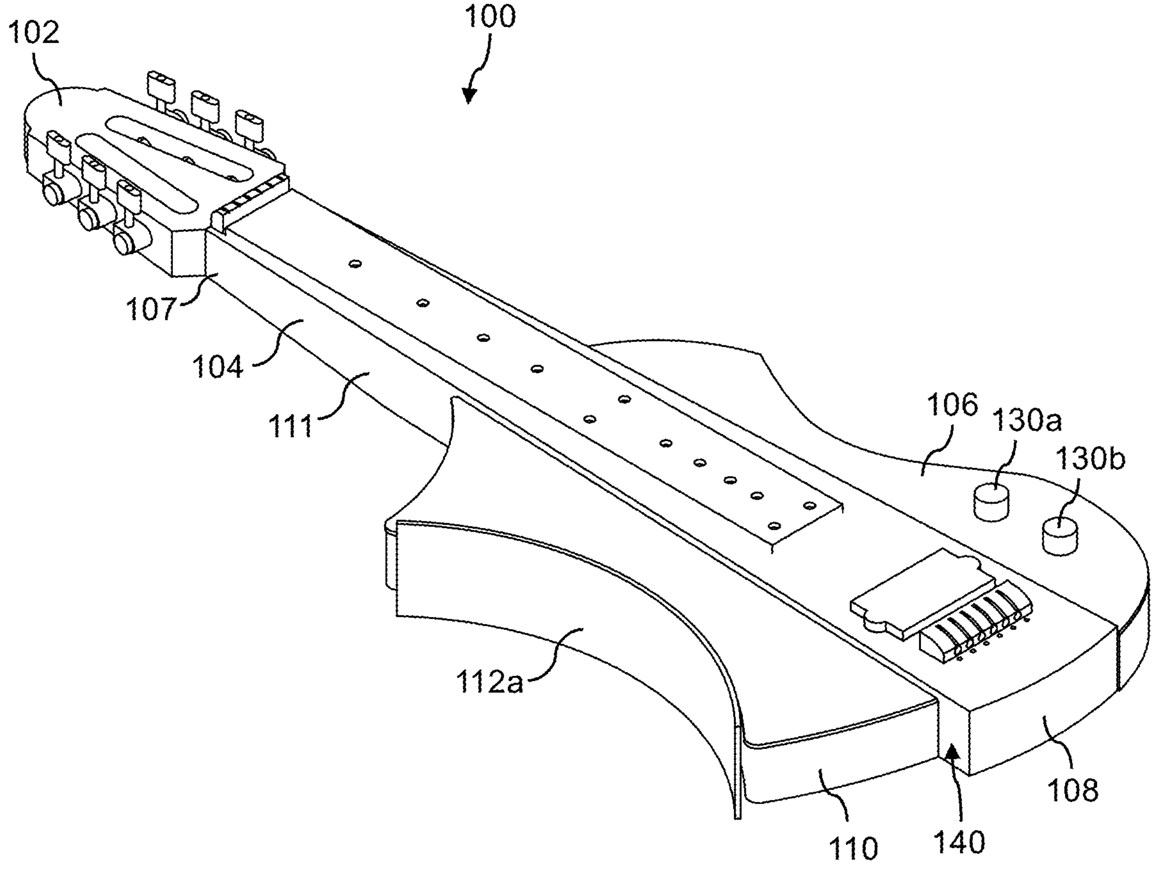
FIG. 2 is a top perspective view of the guitar of FIG. 1 with the belly body in a first modified position.
Figure 3:
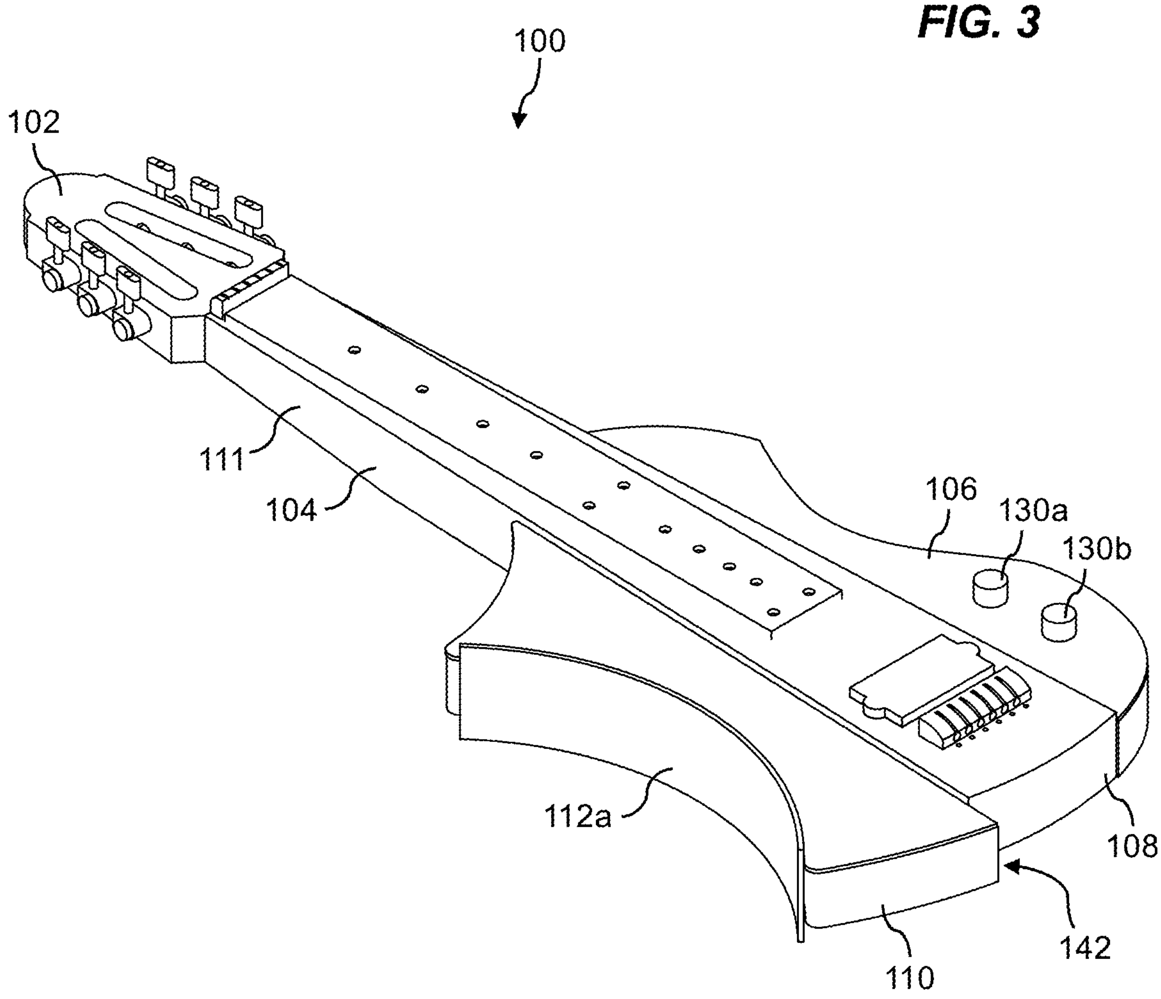
FIG. 3 is a top perspective view of the guitar of FIG. 1 with the belly body in a second modified position.
Figure 9:
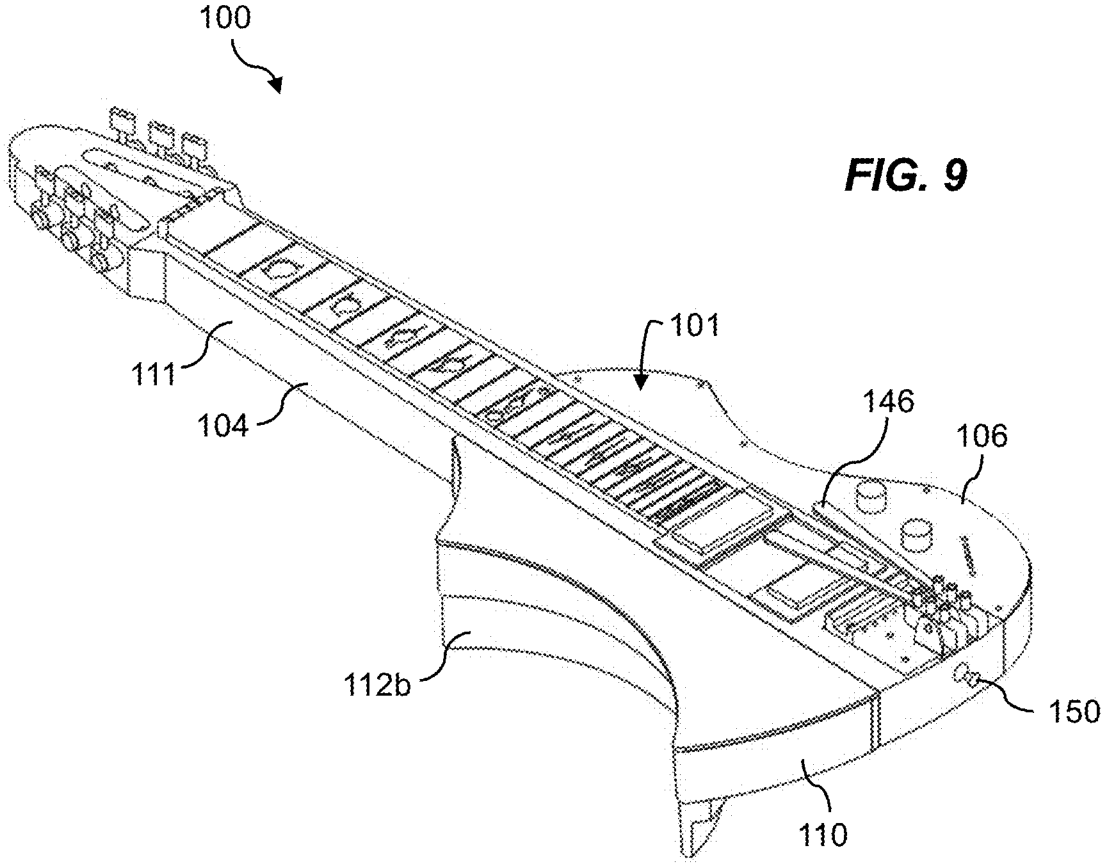
FIG. 9 is a top perspective view of a guitar, in accordance with some embodiments described herein.
Figure 10:
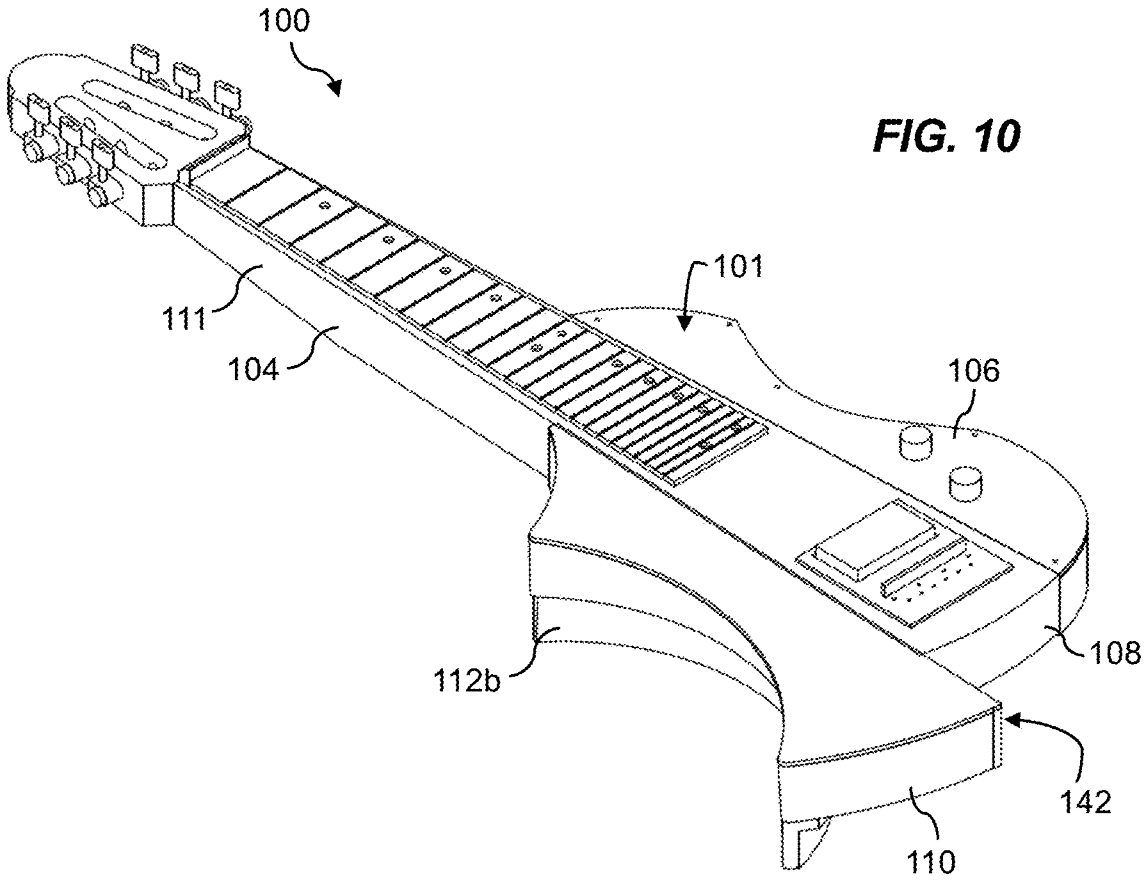
FIG. 10 is a top perspective view of the guitar of FIG. 7 with the belly body in a second modified position.
Figure 11:
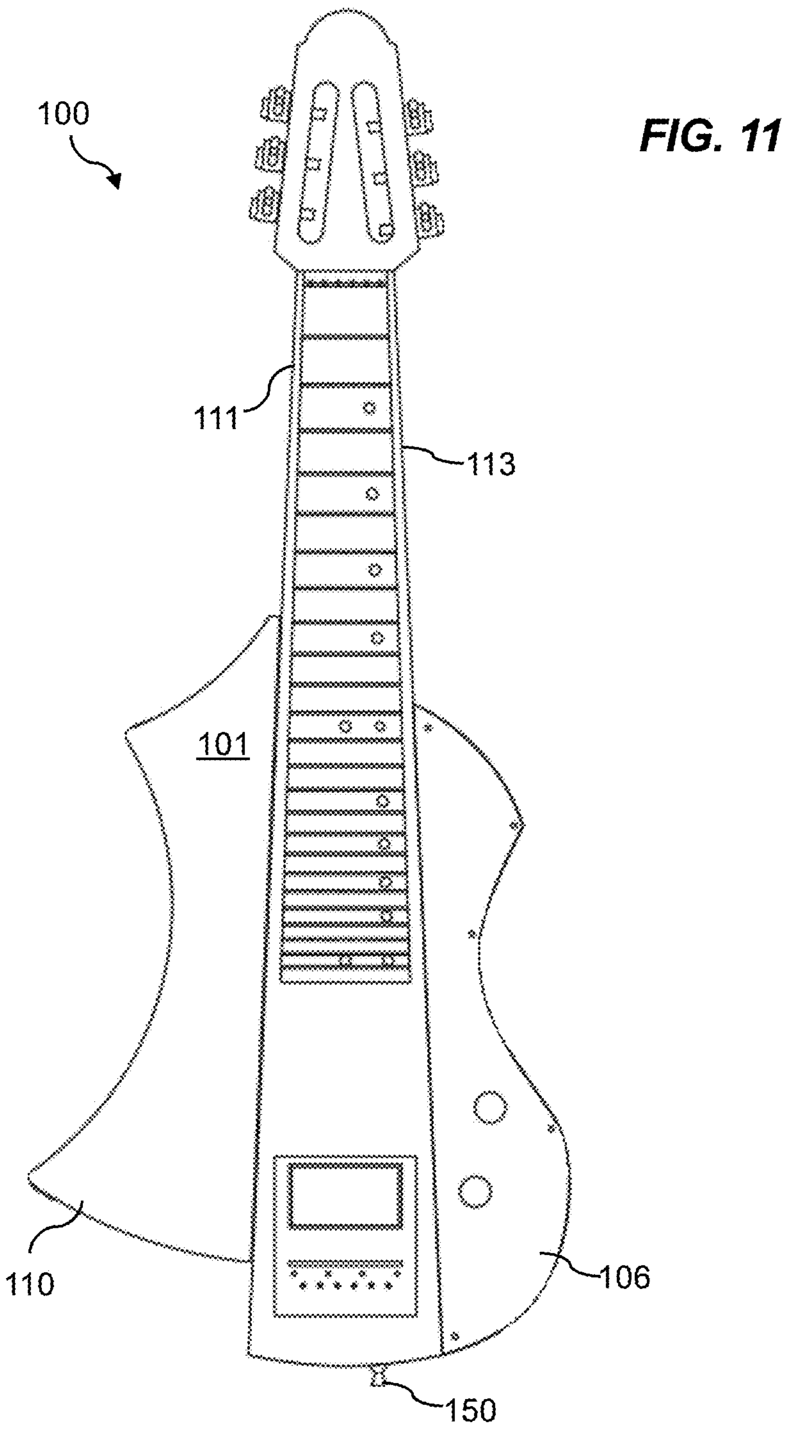
FIG. 11 is a top view of the guitar of FIG. 7 with the belly body in a first modified position.

In some embodiments, as shown in FIGS. 1-5 and FIGS. 7-11, the belly body 110 is coupled to the first side 111 of the neck body 104. In some embodiments, the belly body 110 is coupled to the neck body 104 in a manner that allows the belly body 110 to move or slide in a longitudinal direction toward the first end 107 of the neck body 104. In some embodiments, the belly body 110 is coupled to the neck body 104 in a manner that allows the belly body 110 to move or slide in a longitudinal direction toward the second end 108 of the neck body 104. In some embodiments, the belly body 110 is coupled to the neck body 104 in a manner that allows the belly body 110 to move or slide in a longitudinal direction either toward the first end 107 or toward the second end 108 of the neck body 104 (i.e., the belly body 110 can slide longitudinally in either direction). For example, FIG. 1 and FIGS. 7-9 show the belly body 110 in an unmodified, home position; FIG. 2 and FIG. 11 show the belly body 110 in a first modified position; and FIG. 3 and FIG. 10 show the belly body 110 in a second modified position.

As shown in FIG. 2 and FIG. 11, the belly body 110 has been slid toward the first end 107 of the neck body 104, to the first modified position. In such embodiments, when the belly body 110 is in the first modified position, the exposed surface area 140 on the first side 111 of the neck body 104 is created between the belly body 110 and the second end 108 of the neck body 104. In some embodiments, the exposed surface area 140 on the first side 111 of the neck body 104 is based on the movement of the belly body 110 by a distance in the range of about 0.5 inches to about 5 inches, or from about 1 inch to about 4 inches, including subranges such as a range from about 2 inches to about 3 inches.

As shown in FIG. 3 and FIG. 10, the belly body 110 has been slid toward the second end 108 of the neck body 104, to the second modified position. In such embodiments, when the belly body 110 is in the second modified position, an exposed surface area 142 on surface 116 (FIG. 6B) of the first side 115 of the belly body 110 is created between the belly body 110 and the second end 108 of the neck body 104. In some embodiments, the exposed surface area 142 on the first side 115 of the belly body 110 is based on the movement of the belly body 110 by a distance in the range of about 0.5 inches to about 5 inches, or from about 1 inch to about 4 inches, including subranges such as a range from about 2 inches to about 3 inches.

Figure 12:
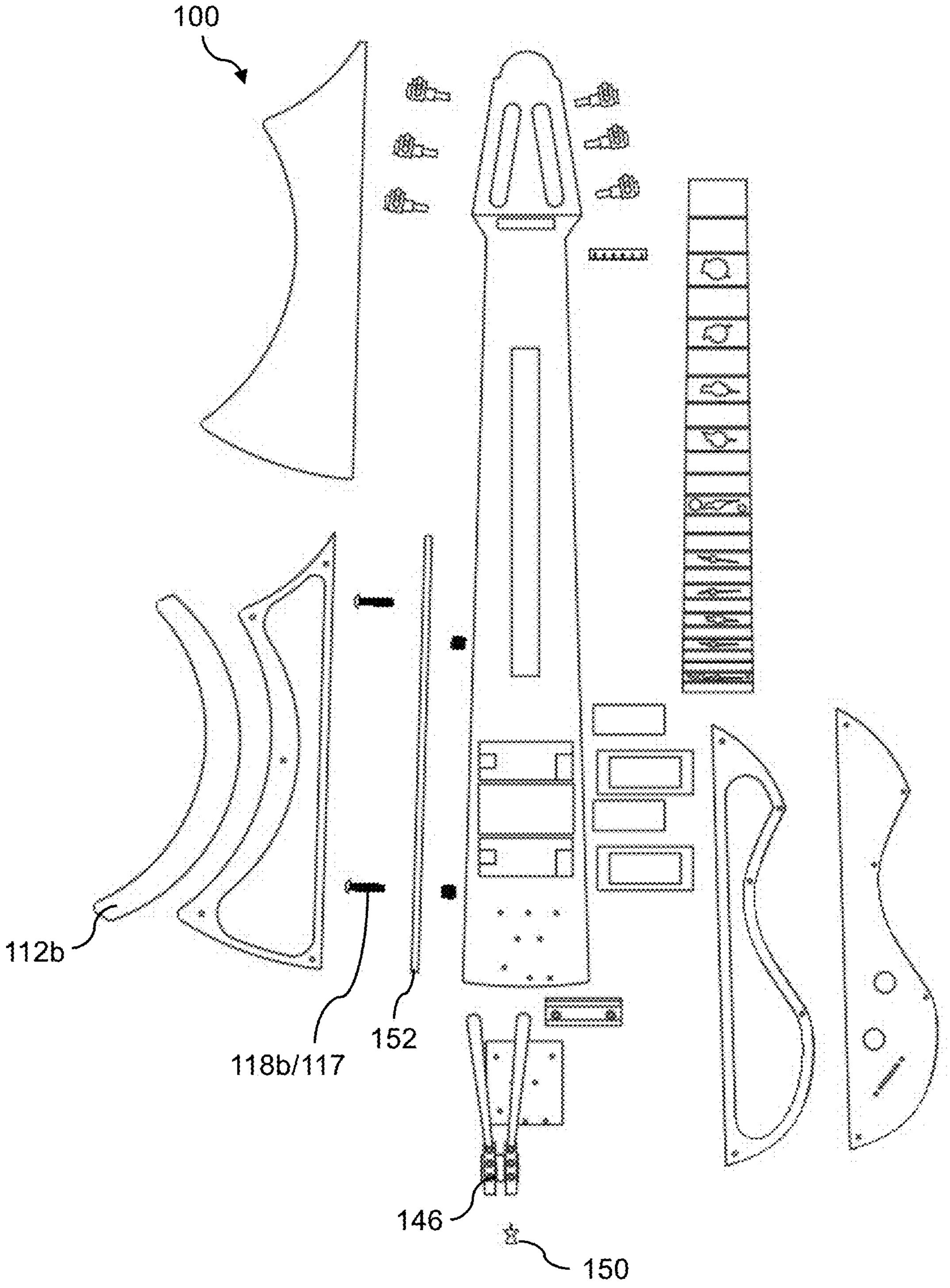
FIG. 12 is an exploded view of the guitar of FIG. 7.
Figure 14:
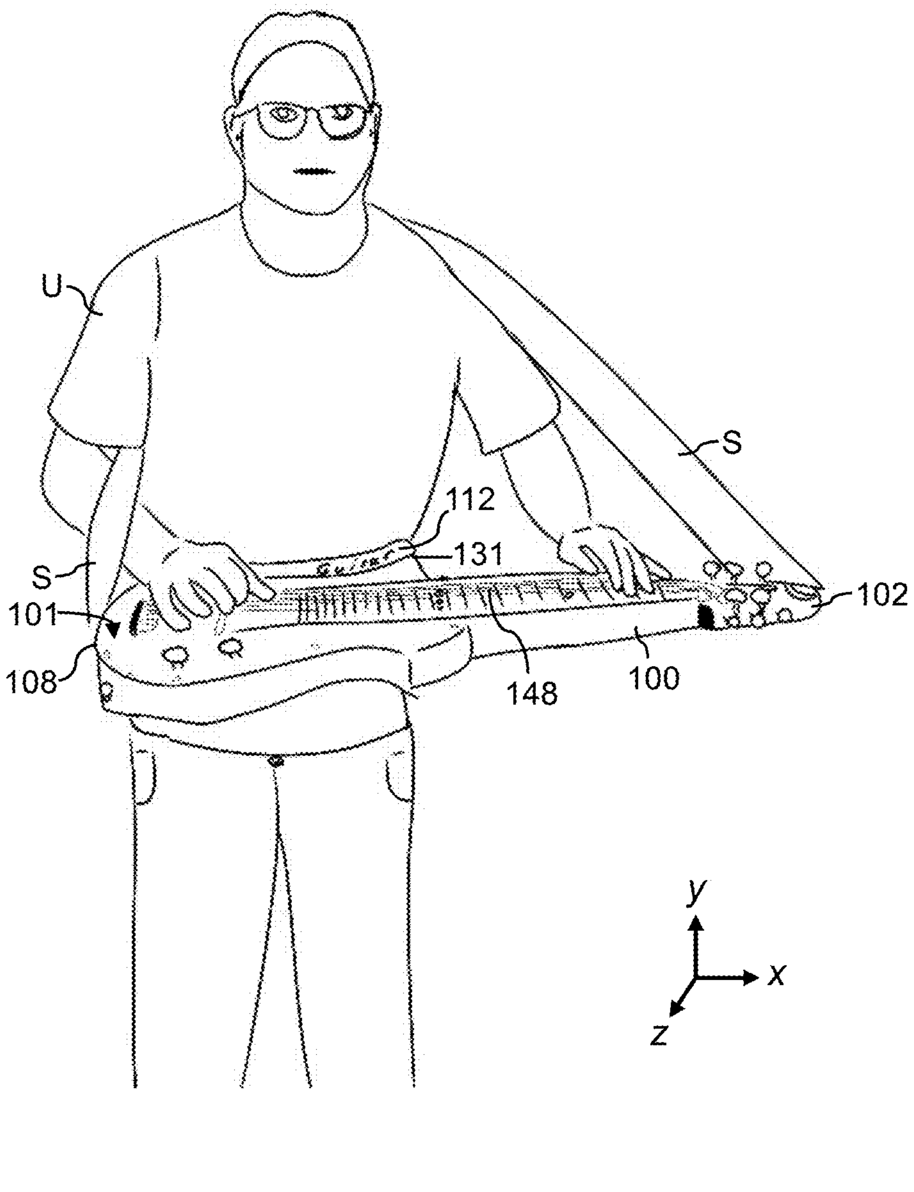
FIG. 14 is an environmental view of the steel guitar of FIG. 1 being used by a user.

In some embodiments, as shown in FIGS. 1-3 and FIGS. 7-11, the belly body 110 is movable and slidable between the home position, the first modified position, and the second modified position. In such embodiments, the slidable belly body 110 allows the user to adjust the position of the steel guitar 100 longitudinally (i.e., about the x-axis) with respect to the user's torso (core). For example, as shown in FIG. 14, the user U is shown standing upright while holding the guitar 100 with the assistance of the strap S, which is coupled to both the headstock 102 and the strap button 150 (FIGS. 9, 11, and 12) at the second end 108 of the neck body 104, and also wrapped around the user U. It is common for the user U to lace an arm under the strap S, as illustrated in FIG. 14, so their hand can manipulate the guitar components on the second end 108 of the neck body 104. In some embodiments, the slidable belly body 110 allows the user U to adjust the longitudinal position of the guitar 100 (about the x-axis) to a more comfortable guitar playing position. In some embodiments, as shown in FIGS. 9, 11, and 12, the strap button 150 is positioned on the second end 108 of the neck body 104 in an off-center position. In such embodiments, the off-center position allows the guitar 100 to be angled at a preferred playing position for the user U.

In some embodiments, the guitar 100 comprises a spacing strip 152, as shown in FIG. 12, positioned between the first side 111 of the neck body 104 and the belly body 110. In some embodiments, the spacing strip 152 functions as a spacer for the belly body 110 and the neck body 104, whereby the thickness of the spacing strip 152 will define the spaced distance therebetween. In some embodiments, the spacing strip functions as a surface for facilitating the sliding of the belly body 110 about the longitudinal axis of the neck body 104. In some embodiments, for example, the spacing strip is comprised of a plastic, metal, or wood material.

Figure 5:
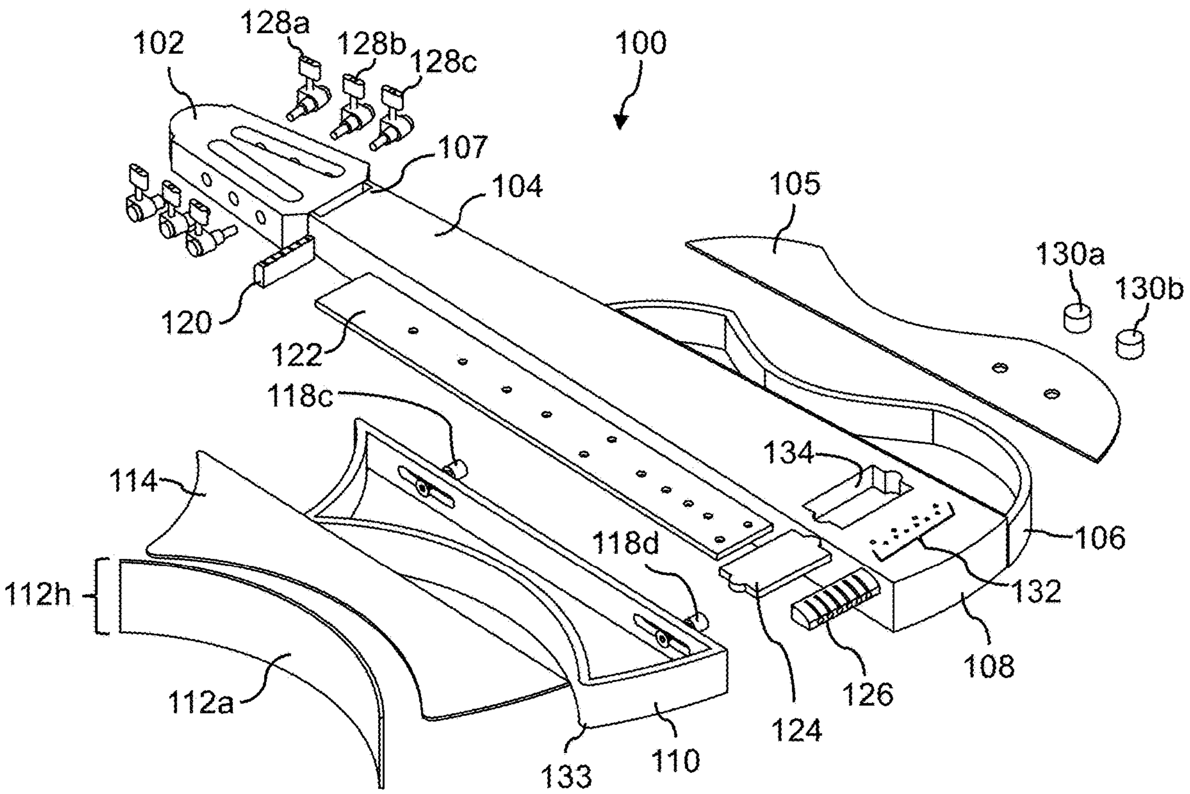
FIG. 5 is an exploded view of the guitar of FIG. 1.

The exploded view in FIG. 5 and FIG. 12 show the various components of the guitar 100 and how they are assembled. In some embodiments, for example, the headstock 102 at the first end 107 of the neck body 104 comprises a plurality of through-holes configured to receive the plurality of tuners (e.g., 128*a*, 128*b*, 128*c*, etc.). In some embodiments, the neck body 104 is configured with a slot recessed into the top face 101 in a position adjacent to the headstock 102, in which the slot is configured to receive the nut 120. In some embodiments, the fretboard 122 is attached to the top face 101 of the neck body 104, the fretboard having a flat, elongated, and trapezoidal (i.e., tapered from the first end 107 to the second end 108) structure configured to lie on the top face 101. In some embodiments, the pickup

124, or a plurality of pickups, and the bridge 126 are attached to the top face 101 of the neck body 104 at a position proximate to the second end 108 (e.g., between the bridge end of the fretboard 122 and the bridge 126). In such embodiments, the neck body 104 comprises one or more recessed cavities 134 that are shaped and configured to receive the one or more pickups 124 having a complementary shape to the recessed cavities. In some embodiments, there is a first through-hole (not shown) in the cavity 134 that extends to the electronic body 106, which allows electrical wires to run from the pickup 124 to the electronic components in the electronic body 106. In some embodiments, there is a second through-hole (not shown) that extends between the cavity 134 and the electronic body 106 to properly ground the bridge 126. In some embodiments, the neck body 104 comprises a plurality of through-holes 132 in the top face 101 that are configured for guitar strings, which run from the through-holes 132 to the tuners on the headstock 102. In such embodiments, the guitar strings can be inserted through on the ferrules 138 on the bottom face 103 of the neck body 104 (FIG. 6D), to the through-holes 132 on the top face 101, and then to the bridge 126, and eventually to the nut 120 and tuners 128.

In some embodiments, as shown in FIG. 5 and FIG. 12, the electronic body 106 comprises the cover 105, which is generally flat and has a two-dimensional shape that is complementary to the shape of the electronic body 106. In some embodiments, the cover 105 is a removable lid. In some embodiments, the cover 105 comprises one or more through-holes configured to receive a portion of one or more knobs (e.g., 130*a*, 130*b*, etc.) that are connected to the electrical components housed within the electronic body 106 and/or the neck body 104.

In some embodiments, as shown in FIG. 5 and FIG. 12, the belly body 110 comprises the cover 114, which is generally flat and has a two-dimensional shape that is complementary to the shape of the belly body 110. In some embodiments, the cover 114 is a removable lid. As shown in FIG. 6B and FIG. 6C, the belly body 110 comprises a first side 113 and a second side 115. In some embodiments, the first side 113 is shaped and configured to receive the lower torso area (e.g., waist, belly) of the user U. The first side 113, for example, has a curved shape. In some embodiments, the second side 116 is shaped and configured to slide longitudinally about the surface of the first side 111 of the neck body 104. In such embodiments, for example, the second side 116 includes a linear elongated shape and a flat surface.

Figure 13A:
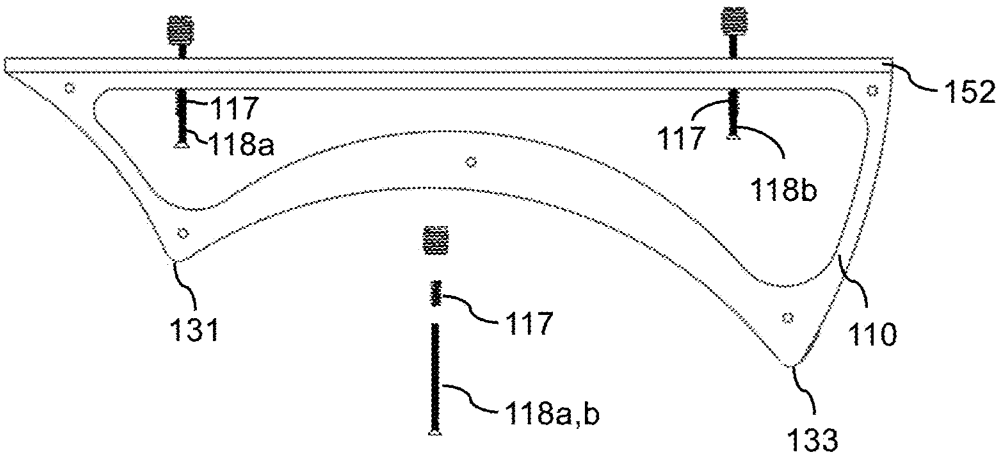
FIG. 13A is a top view of the belly body of the guitar of FIG. 7.
Figure 13B:
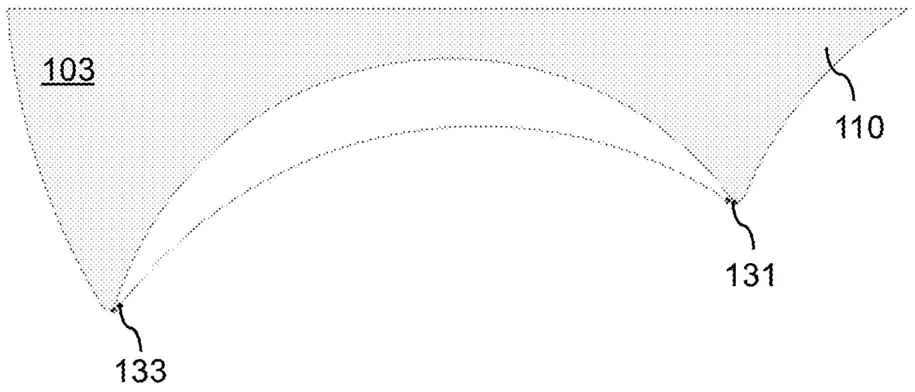
FIG. 13B and FIG. 13C are bottom views of the belly body of the guitar of FIG. 7.
Figure 13C:
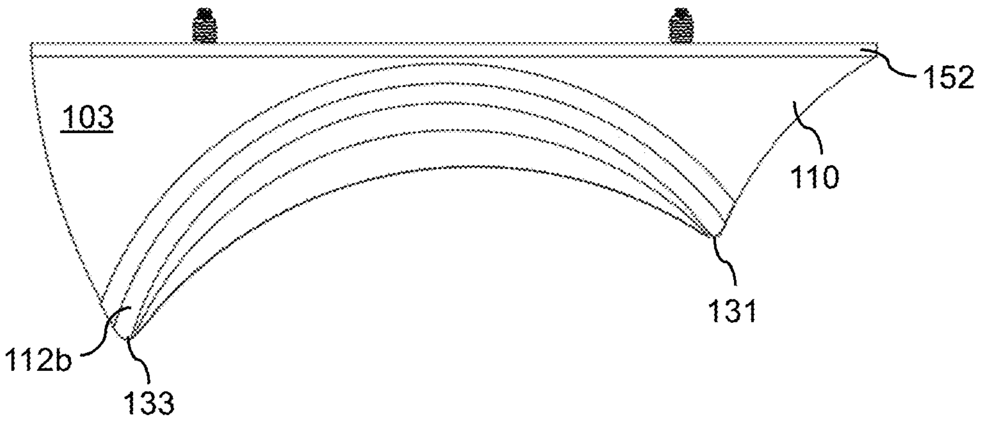
Figure 13D:
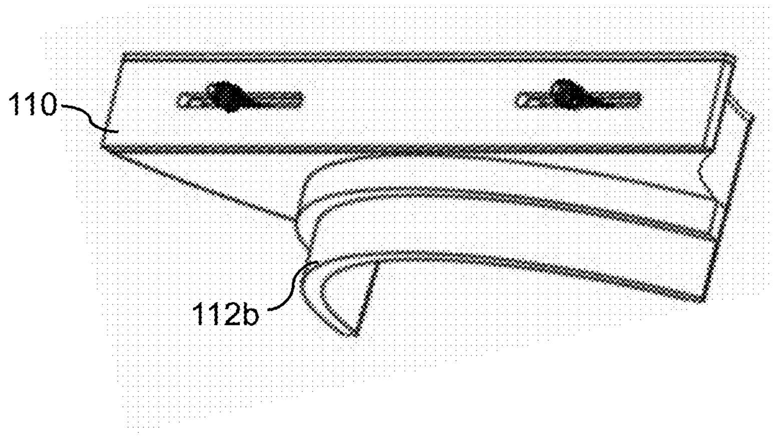
FIG. 13D is a bottom perspective view of the belly body of the guitar of FIG. 7.
Figure 13E:
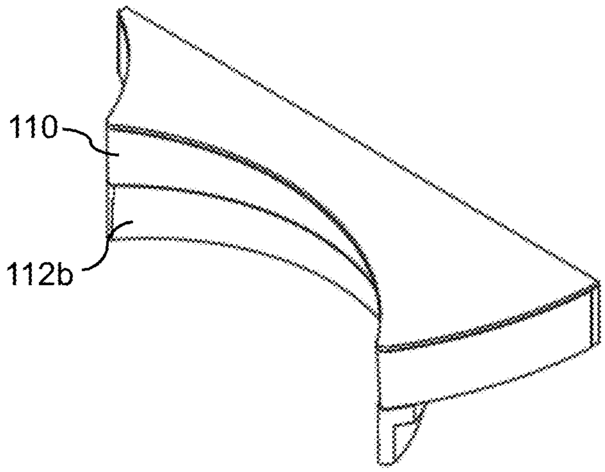
FIG. 13E is a top perspective view of the belly body of the guitar of FIG. 7.
Figure 13F:
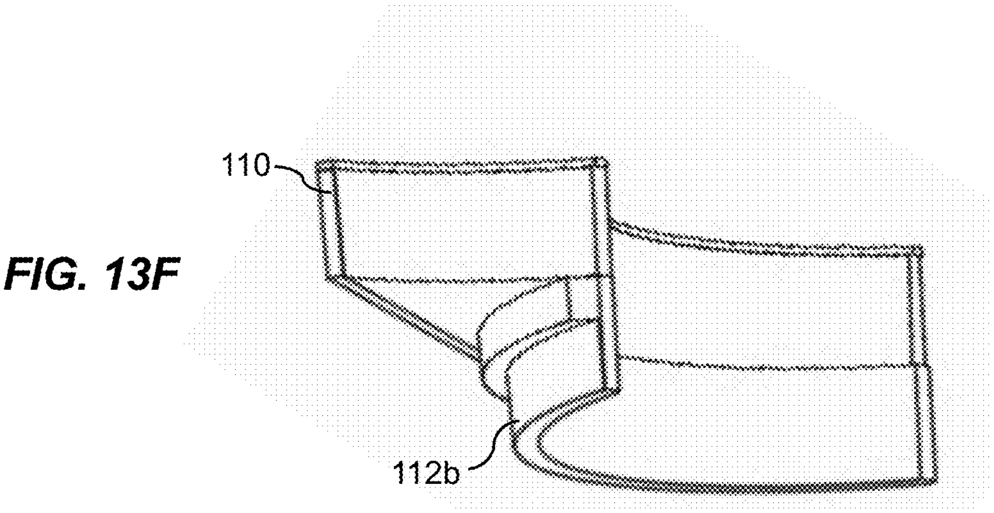
FIG. 13F is a side view of the belly body of the guitar of FIG. 7.

As shown in FIG. 6B, FIG. 6C, and FIG. 13D, in some embodiments, the first side 115 of the belly body 110 comprises the slots 119*a* and 119*b*. In such embodiments, the slots 119*a*, 119*b* are configured to receive the fasteners 118*a* and 118*b*, respectively, which are configured to couple the belly body 110 to the neck body 104. The slots 119*a* and 119*b* can have any suitable length. In some embodiments, for example, each of the slots 119*a* and 119*b* span in length in a range of about 1 inch to 5 inches, including, for example about 1 inch, about 2 inches, about 3 inches, about 4 inches, etc. In some embodiments, as shown in FIGS. 6D and 6E, the neck body 104 includes the through-holes 136*a* and 136*b*. In such embodiments, the through-holes 136*a* and 136*b* in the sidewall of the neck body 104 have a shape that is complementary to the cross-sectional shape of the fasteners 118*a* and 118*b*, respectively. In some embodiments, the through-holes 136*a* and 136*b* are aligned with a threaded nut positioned on the interior surface of the neck body 104, the threaded nut being counter-threaded for threads on the fasteners 118*a* and 118*b*. In some embodiments, the threaded nut is fixed to a position such that the nut openings are positioned to function with the through-holes 136*a* and 136*b*.

As would be appreciated by one of ordinary skill in the art, the slots 119*a* and 119*b* on the belly body 110 and the through-holes 136*a* and 136*b* on the neck body 104 may be switched with one another, such that the belly body 110 comprises the through-holes and the neck body comprises the slots. In such embodiments, the belly body 110 would remain adjustable with respect to the neck body 104.

As would be appreciated by one of ordinary skill in the art in view of FIG. 5 and FIG. 12, the cover 114 of the belly body 110 is removable (e.g., screwed into the base of the belly body) and can be removed to access the interior space of the belly body including the fasteners 118*a* and 118*b*. In some embodiments, the fasteners 118*a* and 118*b* can be loosened or removed, the position of the belly body 110 can be adjusted longitudinally or laterally, and then the fasteners 118*a* and 118*b* can be tightened or reinserted when the belly body 110 is in a preferred position for the user U. Once the belly body 110 is in a preferred position, the cover 114 can be resecured back in position (e.g., screwed closed). In some embodiments, as shown in FIG. 13A, the belly body 110 comprises a spring 117 through which each of the fasteners 118*a* and 118*b* is inserted. In such embodiments, the spring 117 provides enough tension to keep the belly body 110 pressed against the neck body 104 and a sufficient tension to allow the user to slide the belly body 110 without removing the cover 114 to access the fasteners.

In some embodiments, the fasteners 118*a* and 118*b* are covered by or coupled to the spacers 118*c* and 118*d* to provide a spaced distance between the belly body 110 and the neck body 104. In some embodiments, the spacers 118*c* and 118*d* are threaded and configured to securely receive a counter-threaded fastener. In some embodiments, the spacers 118*c* and 118*d* are not threaded, and the through-hole in each respective spacer is configured to receive the fasteners 118*a* and 118*b* by sliding the fasteners through the through-holes. The spacers 118*c* and 118*d* can be any suitable material. In this context, a suitable material would not damage the surface of the neck body 104 and/or the belly body 110 and would not interfere with the sound produced by the guitar 100. In some embodiments, for example, the spacers 118*c* and 118*d* are comprised of a plastic, including nylon, metal or metal alloys, rubber, silicone, etc.

Figure 4:
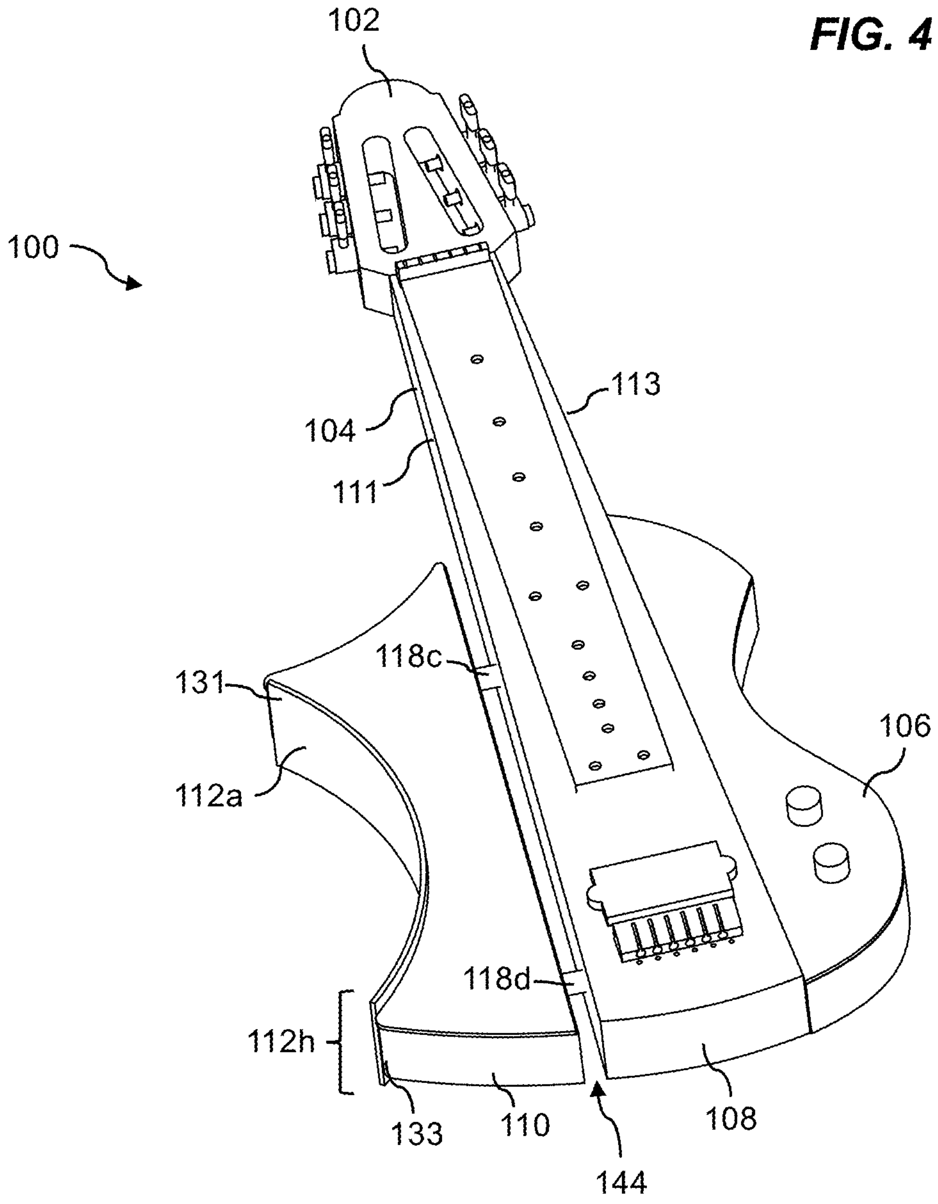
FIG. 4 is a top perspective view of the guitar of FIG. 1 with the belly body in a third modified position.

In some embodiments, as shown in FIG. 4, the belly body 110 can be outwardly extended from the neck body 104, to the third modified position. In such embodiments, when the belly body 110 is in the third modified position, a gap 144 of spaced distance is created between the belly body 110 and the neck body 104. In some embodiments, the gap 144 created between the belly body 110 and the neck body 104 is defined by the size (length) of the spacers 118*c* and 118*d*. The spacers 118*c* and 118*d* can have any suitable length. In this context, the suitability of the length is determined by the distance the user U would like the neck body 104 from their torso (e.g., belly, hips) while the user U is standing, walking, and playing the guitar 100. In other words, the size of the gap 144 is based on the size (length) of the spacers 118*c* and 118*d*, and the size of the preferred gap 144 may be different for different users. As the belly body 110 slides up the neck body 104 toward the first modified position (FIGS. 2 and 11), the neck body becomes closer to the user U. The spacers 118*c* and 118*d* allow the user U to maintain the neck body 104 at a comfortable playing distance from their body when, for example, the guitar 100 is in the first modified position.

In some embodiments, as shown in FIGS. 1-5, the belly body 110 comprises a stabilizer 112*a*. In such embodiments, the stabilizer 112*a* comprises a three-dimensional shape that corresponds to the curved shape of the second side 113 of the belly body 110, as shown, for example, in FIG. 5. In some embodiments, the stabilizer 112*a* is permanently fixed to the second side 113 of the belly body 110. In such embodiments, the stabilizer 112*a* can be attached to the belly body 110 using any suitable fastening agent, including, for example glue. In some embodiments, the stabilizer 112*a* is removably coupled to the second side 113 of the belly body 110. In such embodiments, the stabilizer 112*a* can be removably coupled with a suitable fastener, including, for example, screws, clips, grommets, hook-and-loop fasteners, etc.

In various embodiments, the stabilizer 112*a* is configured with a suitable length and height for stabilizing the guitar 100 against the torso (belly, waist, hips, etc.) of the user U. In some embodiments, the stabilizer 112*a* comprises a height 112*h* that is not equal to the height of the belly body 110. In some embodiments, the stabilizer 112*a* comprises a height 112*h* that is greater than the height of the belly body 110. As shown in FIGS. 1-5, for example, the stabilizer height 112*h* is greater than the height of the belly body 110. In such embodiments, the relatively greater height of the stabilizer 112*a* prevents the guitar 100 from slipping when pressed against the torso of the user U during use. In other words, the stabilizer 112*a* stops the guitar from sliding from a playing position with the top face 101 facing upward (about the y-axis) to a non-playing position with the top face 101 facing toward or away from the user U (about the z-axis).

In various embodiments, the curved, radial shape of the stabilizer 112*a* and the corresponding curved, radial shape of the second side 113 of the belly body 110 are configured to receive the body of the user U. In some embodiments, the size and shape of the neck body 104, including the angle as it narrows from the second end 108 to the first end 107, is dimensioned to work in conjunction with the shape of the stabilizer 112*a* and the second side 113 of the belly body 110 to provide an improved playing position for the user U. In some embodiments, the radial shape of the stabilizer 112*a* and the corresponding curved, radial shape of the second side 113 of the belly body 110 are configured such that, during use, the guitar 100 will be balanced in front of the user U rather than on the right or left hip of the user.

In some embodiments, as shown in FIGS. 7-13E, the belly body 110 comprises a stabilizer 112*b* projecting downward from the edge of the bottom face and the second side of the belly body 110. In such embodiments, the stabilizer 112*b* comprises a concave curved surface configured to receive the torso of a user. In some embodiments, the stabilizer 112*b* comprises a three-dimensional concave curved shape with different dimensions than the concave curved shape of the second side 113 of the belly body 110, as shown, for example, in FIGS. 7, 9, 10, 13D, and 13E. In some embodiments, as shown in FIGS. 7-10 and FIGS. 13C-13E, the stabilizer 112*b* comprises a three-dimensional concave curved shape and an inverted L cross-sectional shape in which the longer, vertical portion of the L-shape projects downward from the outer edge of the bottom face of the belly body 110 and the shorter, horizontal portion of the L-shape is couped to the bottom face. In some embodiments, the stabilizer 112*b* is permanently fixed to the bottom face of the belly body 110. In such embodiments, the stabilizer 112 can be coupled to the bottom face using any suitable fastening agent, including, for example, glue. In some embodiments, the stabilizer 112*b* is removably coupled to the bottom face of the belly body 110. In such embodiments, the stabilizer 112*b* can be removably coupled with a suitable fastener, including, for example, screws, clips, grommets, hook-and-loop fasteners, etc.

In various embodiments, the stabilizer 112*b* is configured with a suitable length and height for stabilizing the guitar 100 against the torso (belly, waist, hips, etc.) of the user U. In some embodiments, the stabilizer 112*b* comprises a height that, when combined with the height of the second side 113 of the belly body 110 results in a total height 112*h*. In some embodiments, the stabilizer 112*b* comprises a height that is greater than, less than, or equal to the height of the second side 113 of the belly body 110. As shown in FIG. 7-10 and FIGS. 13A-13E, for example, the stabilizer height is about equal to the height of the belly body 110. In such embodiments, the combined total height 112*h* of the belly body 110 and the stabilizer 112*b* prevents the guitar 100 from slipping when pressed against the torso of the user U during use. In other words, the stabilizer 112*b* stops the guitar from sliding from a playing position with the top face 101 facing upward (about the y-axis) to a non-playing position with the top face 101 facing toward or away from the user U (about the z-axis).

In various embodiments, the curved, radial shape of the stabilizer 112*b* and the corresponding curved, radial shape of the second side 113 of the belly body 110 are, when combined, configured to receive the body of the user U. In some embodiments, the size and shape of the neck body 104, including the angle as it narrows from the second end 108 to the first end 107, as shown in FIG. 6A, is dimensioned to work in conjunction with the shape of the stabilizer 112*b* and the second side 113 of the belly body 110 to provide an improved playing position for the user U. In some embodiments, the curved shape of the stabilizer 112*b* and the corresponding curved, radial shape of the second side 113 of the belly body 110 are configured such that, during use, the guitar 100 will be balanced in front of the user U rather than on the right or left hip of the user.

In some embodiments, the second side 113 of the belly body 110 and the stabilizer 112*b* each have a concave curved three-dimensional shape. In some embodiments, the curved surfaces of the second side 113 of the belly body 110 and the stabilizer 112*b* are each configured to receive the torso of a user. In such embodiments, the surfaces are pitched at an angle with respect to the top face 101 and the bottom face 103 of the guitar 100. In such embodiments, the upper edge of the second side 113 of the belly body 110 is further in distance from the neck body 104 than the lower edge of the stabilizer 112*b*, which creates the angle. In some embodiments, the angle of the second side 113 and the stabilizer 112*b* are configured such that the top face 101 of the guitar 100 is positioned relative to the torso of the user at an angle in a range of 90 to 165 degrees, or 90 to 130 degrees, or 90 to 120 degrees, including any subranges and endpoints therein (e.g., a range of 91 to 99 degrees), wherein 90 degrees is when the guitar is horizontal and the user is vertical. In some embodiments, as shown in FIGS. 13A and 13B, the angle between the top face and the bottom face of the belly body 110 and/or the angle between the top face of the belly body 110 and the bottom surface of the stabilizer 112*b* varies from a narrow angle at the edges (i.e., near the first and second points 131 and 133) to a broader angle near the middle of the belly body 110. In such embodiments, when the second side 113 and the stabilizer 112*b* are angled down from the horizontal plane, the guitar 100 becomes easier for the user to play and easier for the audience to see the guitar being played. The forward slant created by the angle causes both hands of the user (i.e., the bar hand and the picking hand) to be positioned at more natural and ergonomic positions compared to when the guitar 100 is about horizontal. For example, when the guitar is at about 90 degrees (horizontal), the user's wrists have to rotate up at an angle, but when the guitar is positioned at about 120 degrees the user's wrists can remain straight.

In some embodiments, the scale length of the neck body 104, as measured from the nut 120 to the bridge 126, is in the range of about 18 to about 27 inches, or about 20 to about 26 inches. All subranges, end points, and intermediate points (e.g., 20, 21.5, 22.5, 23, 23.8 inches) are included.

In some embodiments, as shown in FIG. 6A, for example, the first end 107 of the neck body 104 has a width a, and the second end 108 of the neck body 104 has a width d. In some embodiments, the width a is in the range of about 2 to about 3 inches and the width d is in the range of about 3.5 inches to about 7 inches. In some embodiments, for example, the width a is about 2.0, 2.1, 2.2, 2.3, 2.4, 2.5, 2.6, 2.7, 2.8, 2.9, or 3.0 inches. All subranges, end points, and intermediate points (e.g., 2.4 inches) are included. In some embodiments, for example, the width d is about 3.5, 3.6, 3.7, 3.8, 3.9, 4.0, 4.1, 4.2, 4.3, 4.4, 4.5, 5.0, 5.5, or 6.0 inches. All subranges, end points, and intermediate points (e.g., 4.63 inches) are included. In some embodiments the width a and the width d are in a ratio of about 1.17 to about 2.25 (the width d divided by the width a). In some embodiments, the angle 137 of the neck body 104, from the first end 107 to the second end 108 is in the range of about 85° to about 98°, including about 88°, 90°, 92.5°, 94.7°, etc.

In some embodiments, the belly body 110 has a length of about 14 to about 17 inches, including, for example, 14.5, 15.0, 15.25, 15.5, 15.75, 16.0, and 16.25 inches. All subranges, end points, and intermediate points (e.g., 14.9, 15.98, 16.50 inches) are included.

In some embodiments, as shown in FIG. 6A and FIG. 6B, the distance b between the first point 131 of the belly body 110 and the neck body 104 is in the range of about 3.75 inches to about 7 inches. All subranges, end points, and intermediate points (e.g., 4.16, 4.48, 5.1, 5.25 inches) are included. In some embodiments, the distance e between the second point 133 of belly body 110 and the neck body 104 is about 3.25 inches to about 7 inches. All subranges, end points, and intermediate points (e.g., 3.78, 4.05, 4.15, 4.44, 4.75 inches) are included. In some embodiments, the distance b is greater than the distance e. In such embodiments, the distance b and the distance e are in a ratio of about 1.0 to about 2.0 (the distance b divided by the distance e). All subranges, end points, and intermediate points (e.g., a ratio of 1.0, 1.1, 1.2, 1.3) are included. In some embodiments, the distance b is greater than the distance e by a predetermined distance such that, during use, the guitar 100 will be balanced in front of the user U rather than on the right or left hip of the user.

In some embodiments, as shown in FIG. 13A, FIG. 13B, and FIG. 13C, distance between the first point 131 of the belly body 110 and the neck body 104 (now shown) is less than the distance between the second point 133 of the belly body 110 and the neck body 104. In such embodiments, the distance between the first point 131 and the neck body 104 is in the range of about 3.25 inches to about 7 inches. All subranges, end points, and intermediate points (e.g., 3.78, 4.05, 4.15, 4.44, 4.75 inches) are included. In some embodiments, the distance between the second point 133 and the neck body 104 is about 3.75 inches to about 7 inches. All subranges, end points, and intermediate points (e.g., 4.16, 4.48, 5.1, 5.25 inches) are included. In such embodiments, the distance between the second point 133 and the neck body 104 and the distance between the first point 131 and the neck body 104 are in a ratio of about 1.0 to about 2.0. All subranges, end points, and intermediate points (e.g., ratio of 1.0, 1.1, 1.2, 1.3, etc.) are included. In some embodiments, the ratio is predetermined such that, during use, the guitar 100 will be balanced in front of the user U rather than on the right or left hip of the user.

In some embodiments, the distance between the first point 131 and the neck point 135 and the distance between the second point 133 and the neck point 135 are important distances with respect to using the guitar 100, as those distances determine the location of the headstock and fretboard, for example, from the hands of the user U. When the positions of the guitar components are a in a proper position, the user U will be able to play without having to turn their body sideways or without having to reposition the guitar 100 in front of the user U. Because each user has a different body type and arm lengths, the adjustable belly body 110 allows for the positions of the first point 131 and the second point 133 to be balanced with one another so the guitar 100 remains stable and does not slide longitudinally about the x-axis or laterally about the z-axis.

In various embodiments of the guitar 100 shown in FIGS. 1-14 is configured for a right-handed user. In such embodiments, the belly body 110 is coupled to the first side 111 of the neck body 104 and the electrical body 106 is positioned on (i.e., the neck body 104 and the electrical body 106 are formed from a single material) or coupled to (i.e., the neck body 104 and the electrical body 106 are formed from a discrete materials) the second side 113 of the neck body 104. One of skill in the art would appreciate that the guitar 100 could be reconfigured for a left-handed user, whereby the belly body 110 is coupled to the second side 113 of the neck body 104 and the electrical body 106 is coupled to the first side 111 of the neck body 104.

In various embodiments, the guitar 100 is provided. In some embodiments, the guitar 100 comprises the adjustable belly body 110. In some embodiments, the belly body 110, in conjunction with the neck body 104 is configured allow the user U to adjust the position of the belly body 110 relative to the neck body 104. In such embodiments, the belly body 110 can be moved to the first modified position, the second modified position, the third modified position, a combination of the first and third modified positions, or a combination of the second and third modified positions. The modified positions allow the user U to adjust the positioning of the guitar 100 relative to their body while (or before) playing the guitar in a standing position or while walking. In some embodiments, the belly body 110 comprises the stabilizer 112*a*/112*b*. In such embodiments, the stabilizer 112*a*/112*b* is configured to prevent, or reduce the occurrence of, the guitar 100 from sliding downward on the user while in a standing position. In some embodiments, the guitar 100 comprises the benders 146. During use, the user pushes the benders and because the guitar 100 is pressed against the user's torso and angled off the horizontal plane, the force applied on the benders 146 is toward the user rather than only downward toward the floor. The combination of the adjustable belly body 110, the neck body 104, the strap button 150, and the strap, it is easier for the user to use the benders 146 compared to the benders on existing guitars. Accordingly, the guitar 100 provides several advantages over existing guitars.

The foregoing embodiments are provided to aid in the understanding of the present disclosure, the true scope of which is set forth in the appended claims. One of skill in the art would appreciate that modifications can be made in the embodiments set forth without departing from the spirit of the disclosure.

Exemplary embodiments and examples of the products and systems are described above in detail. The products and systems are not limited to the specific embodiments described herein, but rather, components of the products and systems may be utilized independently and separately from other components described herein. For example, the system may also be used in combination with other systems and methods, and is not limited to practice with only a system as described herein. Rather, the exemplary embodiment can be implemented and utilized in connection with many other systems.

A recitation of ranges of values herein are merely intended to serve as a shorthand method of referring individually to each separate value falling within the range, unless otherwise indicated herein, and each separate value is incorporated into the specification as if it were individually recited herein. As will be understood by one skilled in the art, ranges disclosed herein encompass any and all possible subranges and combinations of subranges thereof. Any listed range can be easily recognized as sufficiently describing the same range being broken down into at least equal halves, thirds, quarters, fifths, tenths, etc. For example, a range of 2% to 3% includes 2.3% to 2.8%, 2.4% to 2.9%, etc. As a non-limiting example, each range discussed herein can be readily broken down into a lower third, middle third and upper third, etc. As will also be understood by one skilled in the art, language such as "up to," "at least," "greater than," "less than," and the like include the number recited and refer to ranges which can be subsequently broken down into subranges as discussed above. Finally, as will be understood by one skilled in the art, a range includes each endpoint and individual member. For example, a range of 4% to 10% includes the subranges 5% to 9%, 6% to 8%, etc., and each endpoint (e.g., 4%, 5%, 6%, 8%, 9%, 10%) can be recited as an individual limitation.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context.

As used herein, the use of examples, or exemplary language (e.g., "such as"), is intended to illuminate the embodiments and does not pose a limitation on the scope of the claims unless otherwise stated. No language in the specification should be construed as indicating any non-claimed element as essential.

As used herein, the terms "about" and "substantially" will be understood by persons of ordinary skill in the art and will vary to some extent depending upon the context in which it is used. If there are uses of the term that are not clear to persons of ordinary skill in the art, given the context in which it is used, "about" and "substantially" will mean up to plus or minus 10% of the particular term.

In this description, relational terms such as "horizontal," "vertical," "up," "down," "top," "bottom," as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both moveable or rigid attachments or relationships, unless expressly described otherwise, and includes terms such as "directly" coupled, secured, etc. The term "operatively coupled" is such an attachment, coupling, or connection that allows the pertinent structures to operate as intended by virtue of that relationship. Furthermore, relational terms, such as "first" and "second," and the like, may be used solely to distinguish one entity or element from another entity or element without necessarily requiring or implying any physical or logical relationship, or order between such entities or elements.

I claim:

1. A mobile steel guitar, comprising:

a headstock;

an elongated neck body extending about a longitudinal axis of the guitar from a first end in contact with the headstock to a second end, the neck body having a top face, a bottom face opposite the top face, a first side, and a second side opposite the first side;

an electronic body coupled to the second side of the neck body; and an adjustable belly body coupled to the first side of the neck body, wherein the belly body is slidable about the longitudinal axis of the neck body.

2. The guitar of claim 1, further comprising two or more removeable fasteners coupling the belly body to the first side of the neck body, wherein the two or more removeable fasteners are each fitted with a spring that allows the belly body to slide with respect to the neck body.

3. The guitar of claim 1, further comprising a spacing strip positioned between the first side of the neck body and the belly body, the spacing strip having a surface configured to facilitate the sliding of the belly body about the longitudinal axis of the neck body.

4. The guitar of claim 1, wherein the belly body comprises a top face, a bottom face opposite the top face, a first side having a flat surface configured to contact the first side of the neck body, and a second side, opposite the first side, having a curved surface configured to receive a torso of a user.

5. The guitar of claim 4, wherein the belly body comprises a stabilizer projecting downward from an edge of the bottom face and the second side of the belly body, the stabilizer having a curved surface configured to receive the torso of the user.

6. The guitar of claim 4, wherein the belly body comprises a stabilizer coupled to the curved surface of the belly body, the stabilizer extending below the bottom face of the belly body.

7. The guitar of claim 1, wherein the belly body is moveable about a lateral axis to create a spaced distance between the belly body and the neck body.

8. The guitar of claim 1, wherein the headstock comprises a plurality of tuners for receiving a plurality of guitar strings.

9. The guitar of claim 1, wherein the neck body comprises a fretboard, a nut, one or more pickup cavities, one or more pickups, a bridge, a bridge plate, a plurality of through-holes configured to receive a plurality of guitar strings, one or more benders, and/or a strap button.

10. The guitar of claim 1, wherein the electronic body comprises a removable lid, a volume knob, a tone knob, one or more electronic components, one or more wires, and/or a switch.

11. A mobile steel guitar, comprising:

a headstock;

a neck body extending about a longitudinal axis of the guitar from a first end in contact with the headstock to a second end, the neck body having a top face, a bottom face opposite the top face, a first side, and a second side opposite the first side;

an electronic body coupled to the second side of the neck body; and an adjustable belly body coupled to the first side of the neck body, wherein the belly body is moveable about a lateral axis from an adjacent position to an outwardly extended position that creates a spaced distance between the belly body and the neck body.

12. The guitar of claim 11, further comprising two or more removeable fasteners coupling the belly body to the neck body, wherein the spaced distance is maintained by a spacer configured for each respective fastener.

13. The guitar of claim 11, wherein the belly body comprises a top face, a bottom face opposite the top face, a first side having a flat surface configured to contact the first side of the neck body, and a second side, opposite the first side, having a curved surface configured to receive a torso of a user.

14. The guitar of claim 13, wherein the belly body comprises a stabilizer projecting downward from an edge of the bottom face and the second side of the belly body, the stabilizer having a curved surface configured to receive the torso of the user.

15. The guitar of claim 13, wherein the belly body comprises a stabilizer coupled to the curved surface of the belly body, the stabilizer extending below the bottom face of the belly body.

16. The guitar of claim 11, further comprising a spacing strip positioned between the first side of the neck body and the belly body, the spacing strip having a surface configured to facilitate the sliding of the belly body about the longitudinal axis of the neck body.

17. A mobile steel guitar, comprising:

a headstock;

a neck body extending about a longitudinal axis of the guitar from a first end in contact with the headstock to a second end, the neck body having atop face, a bottom face opposite the top face, a first side, and a second side opposite the first side;

an electronic body coupled to the second side of the neck body; and a belly body comprising a top face, a bottom face opposite the top face, a first side in contact with the first side of the neck body, and a second side, opposite the first side, having a curved surface configured to receive a torso of a user;

wherein the belly body further comprises a stabilizer projecting downward from an edge of the bottom face and the second side of the belly body, the stabilizer having a curved surface configured to receive the torso of the user.

18. The guitar of claim 17, wherein the belly body is removably coupled to the first side of the neck body, the belly body comprising a removable lid on the too face for access to an interior of the belly body, the interior comprising two or more removeable fasteners coupling the belly body to the neck body.

19. The guitar of claim 17, wherein the belly body is slidable about the longitudinal axis of the neck body, and wherein the belly body is moveable about a lateral axis from an adjacent position to an outwardly extended position that creates a spaced distance between the belly body and the neck body.

* * * * *